(12) United States Patent
Wen et al.

(10) Patent No.: US 7,532,752 B2
(45) Date of Patent: May 12, 2009

(54) NON-PHOTOREALISTIC SKETCHING

(75) Inventors: Fang Wen, Beijing (CN); Ying-Qing Xu, Beijing (CN); Heung-Yeung Shum, Beijing (CN); David P. Vronay, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 653 days.

(21) Appl. No.: 11/323,358

(22) Filed: Dec. 30, 2005

(65) Prior Publication Data

US 2007/0154110 A1 Jul. 5, 2007

(51) Int. Cl.
*G06K 9/00* (2006.01)
(52) U.S. Cl. ...................................... 382/162; 382/173
(58) Field of Classification Search ................. 382/112, 382/162, 167, 173, 266, 276, 305; 345/594, 345/650, 661, 676, 863
See application file for complete search history.

(56) References Cited

U.S. PATENT DOCUMENTS

| | | | | |
|---|---|---|---|---|
| 5,977,727 | A * | 11/1999 | Dunbar | 315/382 |
| 6,619,860 | B1 * | 9/2003 | Simon | 382/112 |
| 6,628,295 | B2 * | 9/2003 | Wilensky | 345/594 |

OTHER PUBLICATIONS

Comaniciu, et al., "Mean Shift: A Robust Approach Toward Feature Space Analysis," IEEE Transactions on Pattern Analysis and Machine Intelligence, May 2002, vol. 24, No. 5, pp. 603-619.
DeCarlo, et al. "Stylization and Abstraction of Photographs,"ACM Transactions on Graphics (TOG), Jul. 2002, vol. 21, No. 3, pp. 769-776.
Freeman, et al., "Learning Low-Level Vision," International Journal of Computer Vision, 2000, vol. 40, No. 1, pp. 25-47.
Gooch, et al., "Color2Gray: Salience-Preserving Color Removal," ACM Transactions on Graphics (TOG), 2005, vol. 24, No. 3, pp. 634-639.
Haeberli, "Paint by Numbers: Abstract Image Representations," ACM SIGGRAPH Computer Graphics, Proceedings of the ACM SIGGRAPH 90, Sep. 1990, vol. 24, No. 4, pp. 207-214.
Healey, et al., "Perceptually Based Brush Strokes for Non-photorealistic Visualization,"ACM Transactions on Graphics (TOG), Jan. 2004, vol. 23, No. 1, pp. 64-96.
Hertzmann, "Paint by Relaxation," Computer Graphics International, 2001, pp. 47-54.
Hertzmann, "Painterly Rendering with Curved Brush Strokes of Multiple Sizes," Proceedings of the 25th Annual Conference on Computer Graphics and Interactive Techniques, Jul. 1998, vol. 17, pp. 453-460.

(Continued)

*Primary Examiner*—Kanji Patel
(74) *Attorney, Agent, or Firm*—Lee & Hayes, PLLC

(57) ABSTRACT

A non-photorealistic technique is described for transforming an original image into a sketch image. The technique includes: segmenting the original image into plural regions to produce a segmented image, wherein the regions are demarcated by respective boundaries; shrinking a boundary of at least one of the plural regions in the segmented image to produce a boundary-shrunk image; and modifying at least one color in the boundary-shrunk image to produce the sketch image.

7 Claims, 19 Drawing Sheets
(13 of 19 Drawing Sheet(s) Filed in Color)

OTHER PUBLICATIONS

Levin, et al., "Colorization Using Optimization," ACM Transactions on Graphics (TOG), Aug. 2004, vol. 23, No. 3, pp. 689-694.

Li, et al., "Lazy Snapping," ACM Transactions on Graphics (TOG), Aug. 2004, vol. 23, No. 3, pp. 303-308.

Litwinowicz, "Processing Images and Video for An Impressionist Effect," Proceedings of the 24th Annual Conference on Comlputer Graphics and Interactive Technique, Aug. 1997, pp. 407-414.

Meier, et al., "Interactive Color Palette Tools," IEEE Computer Graphics and Applications, vol. 24, No. 3, pp. 64-72, May/Jun. 2004.

Reinhard, et al., "Color Transfer Between Images," IEEE Computer Graphics and Application, 2001, pp. 34-41.

Shiraishi, et al., "An Algorithm For Automatic Painterly Rendering Based on local Source Image Aproximation," Symposium on Non-photorealistic Animation and Rendering (NPAR), 2000, pp. 53-58.

Weiss, "Interpreting Images by Propagation Bayesian Beliefs," Advances in Neural Information Processing Systems, 1996, pp. 908-914.

Welsh, et al., "Transferring Color to Greyscale Images," ACM Transactions on Graphics (TOG), Jul. 2002, vol. 21, No. 3, pp. 277-280.

Shi et al., "Normalized Cuts and Image Segmentation," IEEE Transactions on Analysis and Machine Intelligence, vol. 22, No. 8, Aug. 2000, pp. 888-905.

Boykov et al., "Fast Approximate Energy Minimization via Graph Cuts," ICCV 99, available at <<http://www.cs.cornell.edu/rdz/Papers/BVZ-iccv99.pdf>>, 8 pages.

Sharon, "Loopy Belief Propagation in Image-Based Rendering," available at <<http://www.cs.ubc.ca/~dsharon/web/papers/lbrBP.pdf>>, accessed on Jun. 14, 2006, 9 pages.

Cooper, California : A Sketchbook, by Chronicle Books LLC Staff, Amazon.com book description, available at <<http://www.amazon.com/gp/product/081182697X/103-5420999-8791065?v=glance&n=283155>>, 6 pages.

Pearl, Probabilistic Reasoning in Intelligent Systems: Networks of Plausible Inference, 1988, Morgan Kaufmann Publishers, San Mateo, California, Amazon.com book description, available at <<http://www.amazon.com/gp/product/1558604790/103-5420999-8791065?v=glance&n=283155>>, 10 pages.

Wyszecki et al., Color Science: Concepts and Methods, Quantitative Data and Formulae, Wiley Interscience Publishers, New York, 1982, Amazon.com book description, availabe at <<http:www.amazon.com/gp/product/0471399183/qid=1150278062/sr=1-1/ref=sr_1_1/103-5420999-8791065?s=books&v=glance&n=283155>>, 8 pages.

Tanaka et al., "Loopy Belief Propagation and Probabilistic Image Processing," available at <<http://www.stats.gla.ac.uk/Research/TechRep2003/03-2.pdf>>, accessed on Jun. 14, 2006, 10 pages.

* cited by examiner

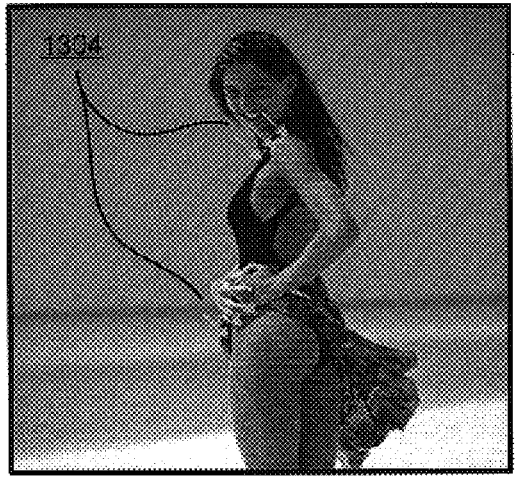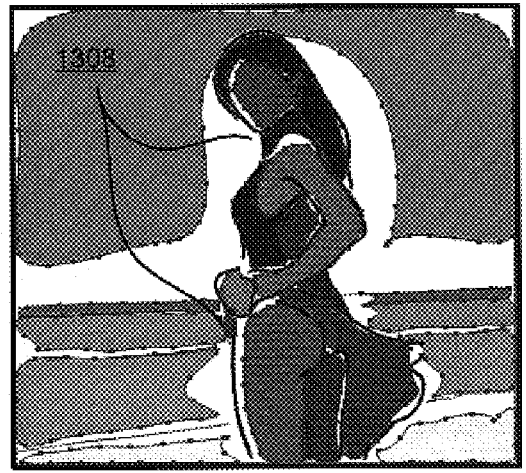
Fig. 13

Homogeneous Regions

NON-PHOTOREALISTIC SKETCHING

BACKGROUND

Many techniques have been developed to modify photographic images in various ways. For instance, well known techniques have been developed to enhance the edges of images, crop the images, change the contrast of images, alter the colors in the images, and so forth. While these techniques may improve the quality of the images in various respects, these techniques do not make substantial changes to the overall style of the images. In other words, the techniques do not produce a significant transformation from one basic motif of creative presentation to another.

On the other hand, a human artist routinely does achieve such creative transformation when producing an artwork. Namely, the artist may paint or draw a picture based on an original scene in a manner that is based on the creative and abstract judgment of the artist. Thus, the objects in the picture are generally not easily predictable transformations of the shapes and colors in the original scene.

For instance, an artist may choose to produce a simplified or perhaps cartoon-like transformation of an original scene. This style is used in many different forms of art, such as posters, water color paintings, graphics design, advertising art, cartoons, animation, and so forth. In this style, the artist typically simplifies the shapes and colors in the original scene in a manner which reflects high-level artistic judgment. For instance, the artist may modify a complex original scene by reducing it to a smaller number of relatively simple shapes having solid colors. The artist may select the colors in the picture to produce a pleasing effect to the eye.

The field of non-photorealistic rendering (NPR) attempts to automatically transform the content of images in non-routine and sometimes abstract ways, as would, for example, a human artist. However, automating the human judgment of an artist has proven to be a very challenging task. For instance, one technique has been described which transforms an image into a line drawing with bold edges and large regions of constant color. However, as appreciated by the present inventors, this technique is a rather indiscriminate transformation of the original image according to simple mapping protocols. The transformation does not take into account the complex judgment exercised by the artist and does not consider the global interplay among the different colors and shapes that appear in the picture.

Accordingly, there is an exemplary need in the art to produce an image-transformation technique that more accurately models the complex human judgment of an artist. There is also a need in the art to produce such an image-transformation technique that is efficient and relatively easy to use.

SUMMARY

A non-photorealistic (NPR) technique is described for transforming an original image into a sketch image. In one implementation, the sketch image is composed of plural regions, each having a solid color.

The technique is generally predicated on two observations regarding sketch images that are manually produced by a human artist. First, the artist often does not apply color to an entire region within the sketch image. That is, to simulate the effects of lighting within the original image and to emphasize certain features, the artist may retract the color from a boundary of the region. Second, the artist may select a color for a region in the sketch image which differs from the color used in the original image. For instance, the artist may select a color for a background region in the sketch image which is lighter than a color used in the counterpart region of the original image. The artist may vary the color in this manner to emphasize the foreground portions of the sketch image.

The technique described herein applies a multi-step procedure to simulate the work of a human artist in producing a sketch image. According to one exemplary implementation, the technique can comprise:

segmenting the original image into plural regions to produce a segmented image, wherein the regions are demarcated by respective boundaries;

shrinking a boundary of at least one of the plural regions in the segmented image to produce a boundary-shrunk image; and modifying at least one color in the boundary-shrunk image to produce the sketch image.

The modifying can comprise:

selecting candidate colors to populate the sketch image;

constructing a graph based on a composition of the original image;

defining an energy function that provides an energy value associated with the graph, wherein the energy function relies on at least one artistic guideline to provide the energy value; and using the energy function to derive a desirable selection of the candidate colors for use in the sketch image.

Still further features and attendant benefits of the image transformation technique will be set forth below.

The subject matter set forth in this Summary section refers to exemplary manifestations of the invention, and hence does not limit the scope of the invention set in the claims section.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 13 shows an example of the overall image transformation that can be produced by the boundary shrinking procedure of FIG. 8.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

The subject matter set forth herein pertains to a non-photorealistic (NPR) technique for transforming an original image to a sketch image. The technique simulates the human judgment of an artist in manually producing the sketch image. The technique includes a procedure to retract at least one boundary within the sketch image to simulate the effects of lighting in the original image and to highlight certain features in the sketch image. The technique also includes a procedure to shift the colors used to create the sketch image to highlight certain features in the sketch image while maintaining a harmonious global combination of colors in the sketch image. The selection of colors is based on various guidelines which encapsulate the human judgment of an artist in making a sketch.

The term "original image" should be construed broadly herein. In the scenario most commonly evoked, the original image corresponds to a digital photograph of any subject, including landscape, people, and so on. However, the original image can comprise any kind of picture. The original image can comprise a photographic image that has already been processed in some way, a graphical presentation, a scanned version of an artistic work, and so forth.

Likewise, the term "sketch image" simply is meant to represent the output of the technique. The qualifier "sketch" loosely means that the image may simulate an artwork produced by a human artist (by painting, drawing, or some other medium).

The technique described herein confers a number of benefits. According to one benefit, the technique produces a sketch image that accurately simulates a drawing or painting that might be produced by a human artist. According to another benefit, the technique produces the sketch image in a manner that is both efficient and easy-to-use (even by those who may not otherwise have training in the arts or in the manipulation of digital images).

This disclosure includes the following sections. Section A sets forth an exemplary system for implementing the NPR technique featured herein. Section B sets forth an exemplary manner of operation of the system of Section A.

Figure 1:
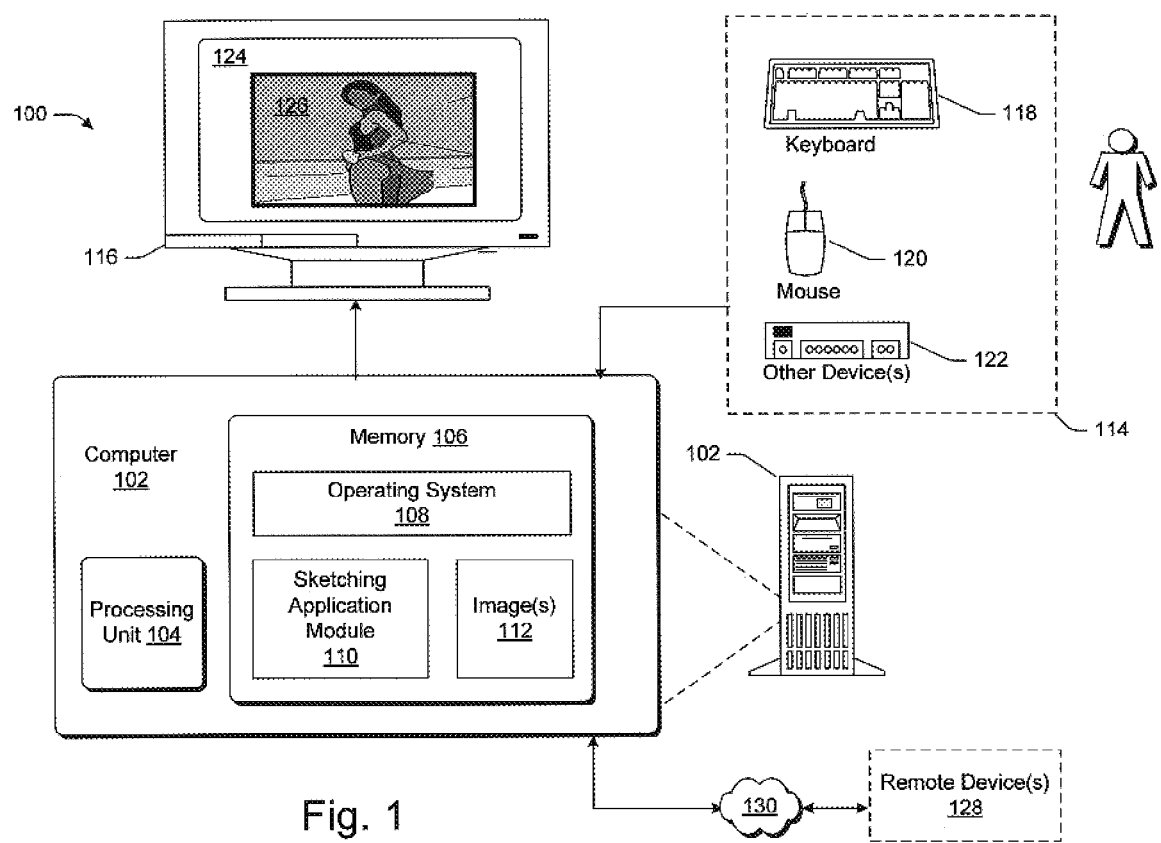
FIG. 1 shows an exemplary system that can be used to implement a non-photorealistic image-transformation technique.

A. Exemplary System (FIG. 1)

Generally, any of the functions described with reference to the figures can be implemented using software, hardware (e.g., fixed logic circuitry), manual processing, or a combination of these implementations. The term "logic, "module" or "functionality" as used herein generally represents software, hardware, or a combination of software and hardware. For instance, in the case of a software implementation, the term "logic," "module," or "functionality" represents program code (or declarative content) that performs specified tasks when executed on a processing device or devices (e.g., CPU or CPUs). The program code can be stored in one or more computer readable media.

More generally, the illustrated separation of logic, modules and functionality into distinct units may reflect an actual physical grouping and allocation of such software and/or hardware, or can correspond to a conceptual allocation of different tasks performed by a single software program and/or hardware unit. The illustrated logic, modules and functionality can be located at a single site (e.g., as implemented by a processing device), or can be distributed over plural locations.

The terms "machine-readable media" or the like refers to any kind of medium for retaining information in any form, including various kinds of storage devices (magnetic, optical, solid state, etc.). The term machine-readable media also encompasses transitory forms of representing information, including various hardwired and/or wireless links for transmitting the information from one point to another.

A.1. Overview of the System

FIG. 1 shows an example of one system 100 that can be used to implement the non-photorealistic (NPR) image transformation technique featured herein. In one implementation, the technique can be implemented by a computer 102, such as a personal computer. The computer 102 includes conventional hardware components, such as a processing unit 104 (or plural processing units), and various volatile and/or non-volatile memory 106. The memory 106 can include an operating system 108 that performs base operating tasks. The memory 106 can also include one or more applications which run "on top" of the operating system 108 and utilize its resources. One such application is a sketching application module 110. The sketching module 110 implements the NPR rendering technique featured herein. In this illustrated implementation, the sketching application module 110 is implemented as machine-readable instructions which perform prescribed operations when these instructions are executed by the processing unit 104.

The sketching application module 110 can receive input in the from of one or more original images, and produce one or more output sketch images. FIG. 1 generally shows that the memory 106 can store images 112, which may represent original images and/or sketch images and/or any intermediate images produced by the sketching application module 110 in the course of performing the NPR technique.

A user can interact with the computer 102 via one or more input devices 114 and a display device 116 (or other form of output device). The input devices can comprise a keyboard 118, a mouse device 120, or any other kind of input device 122. The display device 116 can comprise any kind of computer display monitor. The display device 116 provides a user interface presentation 124. The user interface presentation 124 can display images (e.g., image 126) being processed by the computer 102 and can provide a mechanism which allows the user to manipulate the images (in a manner to be described below).

The above-described implementation is only one exemplary implementation. In another case, the computer 102 can represent a server computer that is accessible to one or more remote devices 128 via a network coupling 130. The network coupling 130 can comprise a WAN-type coupling (e.g., the Internet), a LAN-type coupling, or combination thereof.

In yet another implementation, the sketching application module 110 can be implemented in hardware (instead of machine-readable code), or by a combination of machine-readable code and hardware. In yet another implementation, the sketching application module 110 an be implemented by some other kind of processing device, such as game console, a mobile telephone, a set-top box, a personal digital assistant (PDA) device, and so forth.

A.2. Example of a Generated Sketch Image

Figure 2:
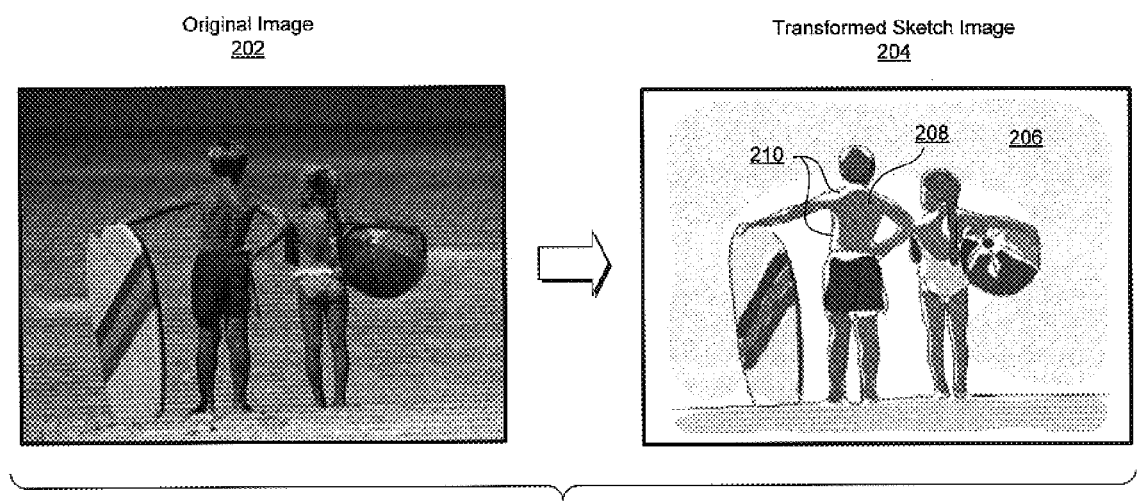
FIG. 2 shows an exemplary transformation of an original image into a sketch image that can be performed using the system of FIG. 1.

Before advancing further with a discussion of the details of the NPR technique, it will be instructive to discuss the end-product of the sketching application module 110, namely the so-called sketch image. To this end, FIG. 2 shows an original image 202 and a transformed sketch image 204. The purpose of the sketching application module 110 is to receive the original image 202 (which may comprise a digital photograph) and transform this original image into the sketch image 204.

Note that the sketch image 204 represents a simplified, abstract, or even cartoon-like transformation of the original image 202. The sketch image 204 is simplified because it reduces the amount of detail in the original image 202. The sketching application module 110 performs this transformation by segmenting the original image 202 into a plurality of regions that have respective common characteristic(s). The sketching application module 110 then treats these regions as homogenous units for the purpose of rendering the sketch image 204. Thus, for instance, the ocean and sky in the original image 202 represent background portions of the photograph which have similar appearance (and furthermore, these portions are not a main topic of interest in the photograph). The sketching application module 110 transforms these portions into a monotone blue region 206. In other words, while there is slight variance in color within the ocean/sky portions of the original image 202, this variance is not duplicated in region 206 of the sketch image 204. The sketch image 204 may highlight distinct regions by drawing the boundaries of these regions in a relatively dark color.

Two interesting properties of the sketch image 204 warrant introductory mention here. First, note that regions within the sketch image 204 are not necessarily completely filled in with color. For instance, consider the region 208 that corresponds to the upper torso of the boy in the sketch image 204. This region 208 is predominately filled in using a skin tone color. However, this region 208 omits the skin tone color on the right side of the torso and on the shoulder portion of the torso (generally denoted in FIG. 2 as receded portion 210). This effect is deliberately produced to emphasize certain detail in the sketch image 204 and to simulate the natural lighting in the scene.

Second, note that the colors used in the sketch image 204 do not necessarily exactly correspond to the colors used in the original image 202. For instance, the background ocean/sky region 206 receives a light blue color in the sketch image 204. However, the counterpart portion of the original image 202 has a much darker range of blue colors. This effect is deliberately produced to emphasize certain foreground features within the sketch image 204 and to generally produce a global combination of harmonious colors within the sketch image 204.

A.3. The Sketching Application Module

Figure 3:
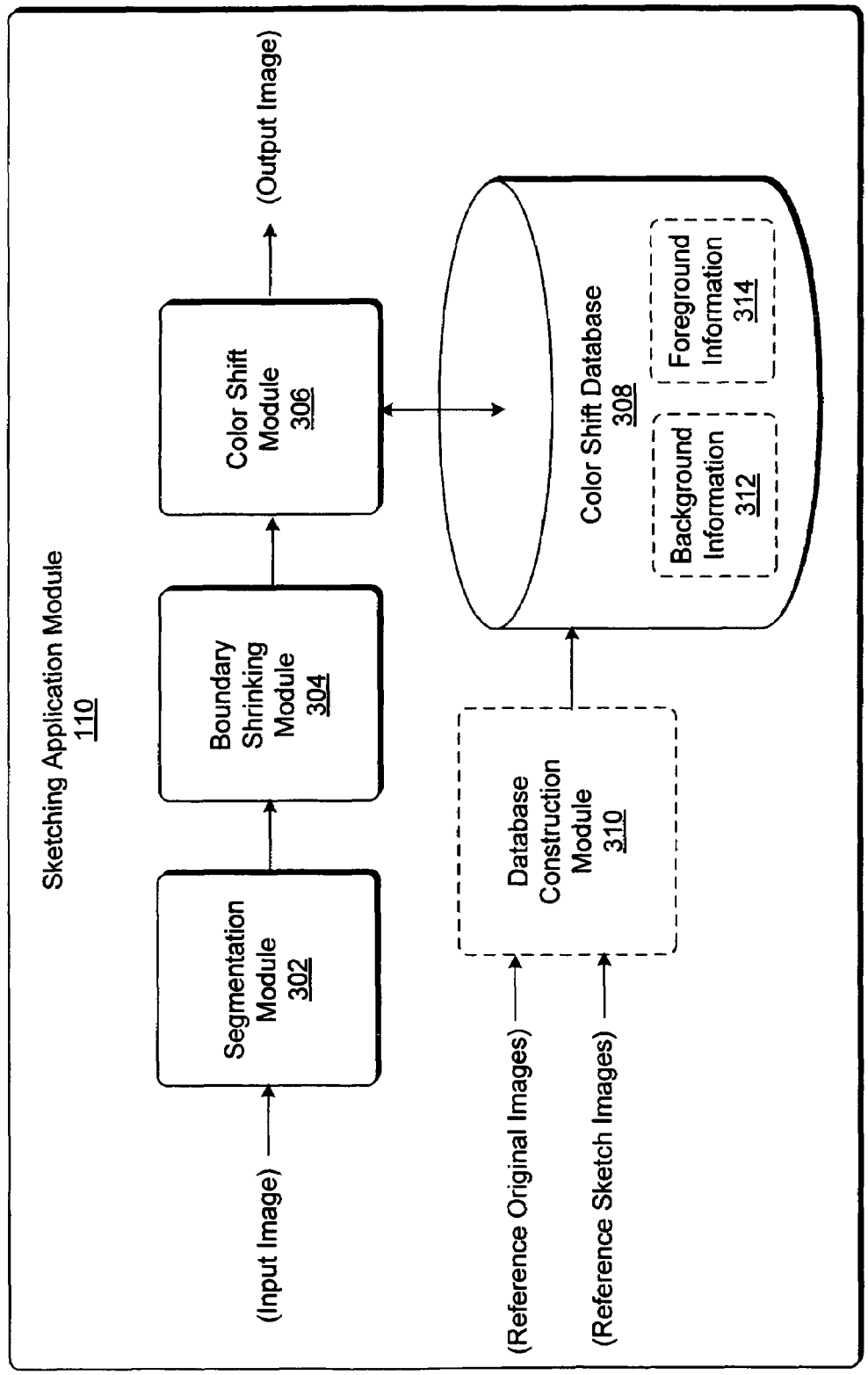
FIG. 3 shows a more detailed depiction of a sketching application module used in the system of FIG. 1.

FIG. 3 depicts further exemplary detail of the sketching application module 110 introduced in the context of FIG. 1.

A top row of modules shown in FIG. 3 performs the core task of transforming the original image into the output sketch image. This collection of modules includes a segmentation module 302, a boundary-shrinking module 304, and a color shifting module 306. The segmentation module 302 segments the original image into plural regions to produce a segmented image. The regions are demarcated by respective boundaries. The boundary-shrinking module 304 shrinks a boundary of at least one of the plural regions in the segmented image to produce a boundary-shrunk image. In other words, this boundary shrinking operation produces the adjustment of the blank region shown in FIG. 2 (e.g., in portion 210). The color shifting module 306 modifies at least one color in the boundary-shrunk image to produce the sketch image. In other words, this color shifting operation produces the transformation of colors shown in FIG. 2 (e.g., in the background ocean/sky region 206).

The color shifting module 306 relies on a color shift database 308. The color shift database 308 is produced by a database construction module 310. If the sketching application module 110 is packaged into a software product that is sold to customers, the database construction module 310 can be included within the suite of modules provided to customers. In another scenario, the sketching application module 110 can omit the database construction module 310 from the suite of modules provided to the customers. In the latter scenario, the sketching application module 110 can include a fully operational color shift database 308 that has been formed in advance by the designers of the sketching application module 308.

In either event, the database construction module 310 accepts both reference original images and reference sketch images. The reference original images may represent original digitized photographs. The reference sketch images may represent sketches that have been manually produced by human artists based on the reference original images. The database construction module 310 operates by: identifying regions in the reference original images; determining average colors used in the identified regions in the reference original images; and determining the colors used by human artists in the counterpart regions of the reference sketch images. The database construction module 310 records the determined colors and the manner in which original colors map into the artists' colors for different regions within the images. More specifically, the database construction module 310 records such data for both background and foreground regions of the images, producing, respectively, background information 312 and foreground information 314 in the color shift database 308.

B. Exemplary Processes

The remainder of the figures shows procedures that explain an exemplary manner of operation of the system 100 shown in FIG. 1, interspersed with exemplary images which show the results of processing performed at various stages of the procedures. To facilitate discussion, certain operations are described as constituting distinct steps performed in a certain order. Such implementations are exemplary and non-limiting. Certain steps described herein can be grouped together and performed in a single operation, and certain steps can be performed in an order that differs from the order employed in the examples set forth in this disclosure.

B.1. Overview of the Procedure

Figure 4:
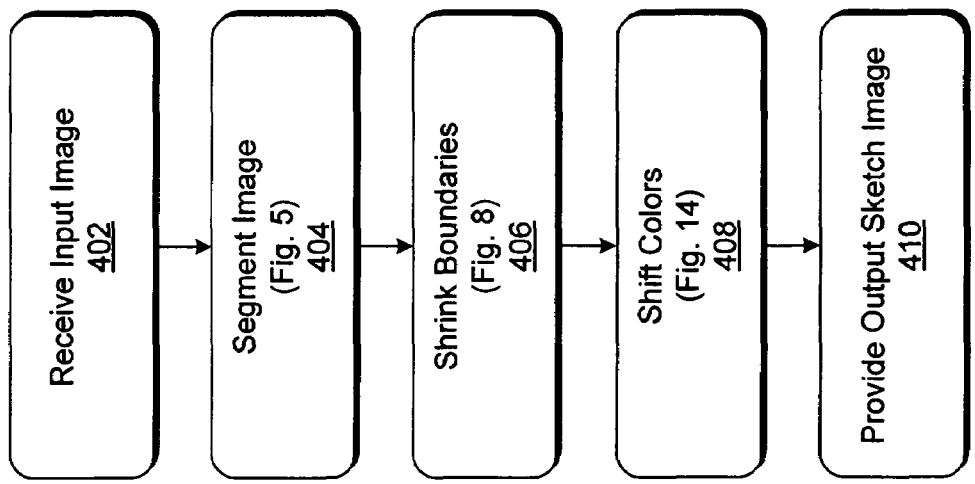
FIG. 4 shows an overview of a procedure for transforming an original image into a sketch image using the system of FIG. 1.

FIG. 4 shows an overview of a procedure 400 that can be used to transform an original image into a sketch image. Later sections provide additional detail regarding individual steps within the procedure 400 of FIG. 4.

In step 402, the sketching application module 110 receives an input image. The sketching application module 110 can receive such an image from any source, such a camera, a scanner, a remote computer device, and so forth. In the examples most commonly evoked herein, the original image corresponds to a digitized photograph of an actual real-world scene, but the original image can comprise any subject matter that can be visually rendered.

In step 404, the sketching application module 110 segments the original image into plural regions to produce a segmented image. The sketching application module 110 performs this task by consolidating portions of the original image that have common characteristics into distinct regions. The sketching application module 110 can use any segmentation technique to achieve this end result. In one implementation, step 404 comprises a procedure that combines both automated and manual processing. Namely, an automated segmentation procedure is applied to provide a first-pass segmentation of the original image. This produces an auto-segmented image. Then, the user is permitted to modify the auto-segmented image to produce the final segmented image. (Alternatively, the segmentation procedure can again apply automated segmentation to the manually-corrected image produced by the user.) The final segmented image includes a set of regions $\{\Omega_i\}$ with vectorized outlines.

In step 406, the sketching application module 110 shrinks the boundaries of the segmented image to produce a boundary-shrunk image. In this procedure, the sketching application module determines a distribution of pixel intensity (e.g., luminance) within each region, and determines how to shrink the boundaries based on this distribution of intensity. Namely, for a particular region, this procedure can involve determining how the intensity varies in a path which stretches across the region (in a normal direction to a starting boundary point). This intensity distribution can be used to determine whether a center of weight of intensity values tends to "favor" one side of the path or the other (indicating whether one part of the region is predominately brighter than the opposite part). The procedure retracts the boundary from the higher-intensity side of the path. This procedure thereby duplicates an artist's rendering of the original image, where the artist may choose to omit color in portions of a region that are relatively bright.

In step 408, the sketching application module 110 shifts colors within the boundary shrunk image to produce the final output sketch image. This procedure relies on a number of considerations, including: the colors used in the original image; the color mapping information stored in the color shift database 308 for background and foreground regions; and various guidelines used to simulate artistic judgment. More specifically, an energy function can be defined that takes into account all of these considerations. Given a set of candidate colors selected from the color shift database 308, the energy function can be used to provide an optimal or near-optimal set of colors to be used in the sketch image. Namely, step 408 can select the optimal or near-optimal set of colors by minimizing an energy value produced by the energy function.

Finally, in step 410, the sketching application module 110 outputs the final sketch image to a target destination. Namely, the sketching application module 110 can send the sketch image to a display for viewing, to storage, to a remote site, and so forth.

The remaining subsections provide additional details regarding the image segmentation procedure (in step 404), the boundary-shrinking procedure (in step 406), and the color-shifting procedure (in step 408).

B.2. Segmenting Procedure and Related Processing

Figure 5:
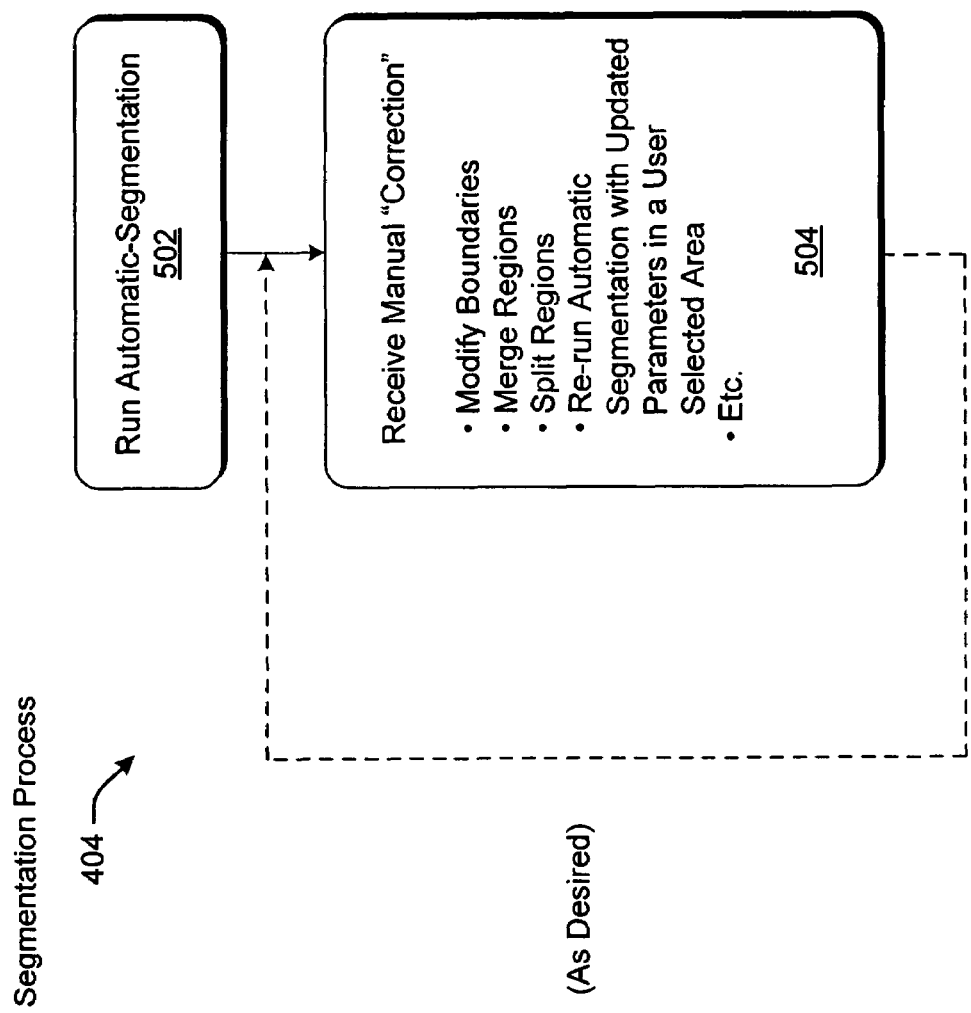
FIG. 5 shows an exemplary segmentation procedure that can be used in the overview procedure of FIG. 4.

FIG. 5 shows additional exemplary details regarding the general segmentation procedure performed in step 404 of FIG. 4.

In step 502, the sketching application module 110 applies an automated segmentation algorithm to the original image to produce an auto-segmented image. The sketching application module 110 can rely on any one or more of a wide variety of known automated segmentation algorithms to perform this task. For instance, the sketching application module 110 can use the "mean shift" technique described by Dorin Comanicui and Peter Meer in "Mean Shift: A Robust Approach Toward Feature Space Analysis," IEEE Transactions on Pattern Analysis and Machine Intelligence, Vol. 24, No. 5, 2002, pp. 1-18. More segmentation methods may also be used in here, such as Normal Cut (e.g., note J. Shi and J. Malik, "Normalized Cuts and Image Segmentation," IEEE Transactions on Analysis and Machine Intelligence, Vol. 22, No. 8, August, 2000, pp. 888-905), Graph Cut (e.g., note Y. Boykov, O. Veksler, and R. Zabih, "Fast Approximate Energy Minimization via Graph Cuts," ICCV 99), and so on.

In step 504, the sketching application module 110 allows the user to manually correct the segmentation results produced by the automated segmentation algorithm. More specifically, the user may choose to manually provide correctives in one or more of at least three scenarios. In a first scenario, the user may believe that a boundary defined the automatic segmentation algorithm is non-optimal, e.g., because the path does not exactly track a true boundary of the region. In this case, the user may correct the boundary path. In a second scenario, the user may believe that the automatic segmentation algorithm has defined a group of adjacent regions as being separate, when in fact they should be integrated. In this case, the user can merge these two adjacent regions. In a third scenario, the user may believe that the automatic segmentation algorithm has failed to define a distinct region in the image, e.g., because that this distinct region is merged into one or more other regions in the auto-segmented image. In this case, the user can split apart this distinct region from its surrounding region(s).

Step 504 can rely on any kind of interactive segmentation technique to manually correct the auto-segmented image. One exemplary interactive segmentation technique allows the user to superimpose correction marks over the displayed auto-segmented image. This interactive segmentation technique can allow the user to make such marks using a mouse device or some other input device (e.g., by permitting the user to add such marks using a click and drag approach, and so forth). The interactive segmentation technique can interpret these marks according to predetermined rules and carry out instructions associated with these marks.

In step 504, the user may also opt to again apply the automated segmentation algorithm with updated parameters to one or more unsatisfactory areas of the image. This might be desirable to simplify the user's intervention.

Figure 6:
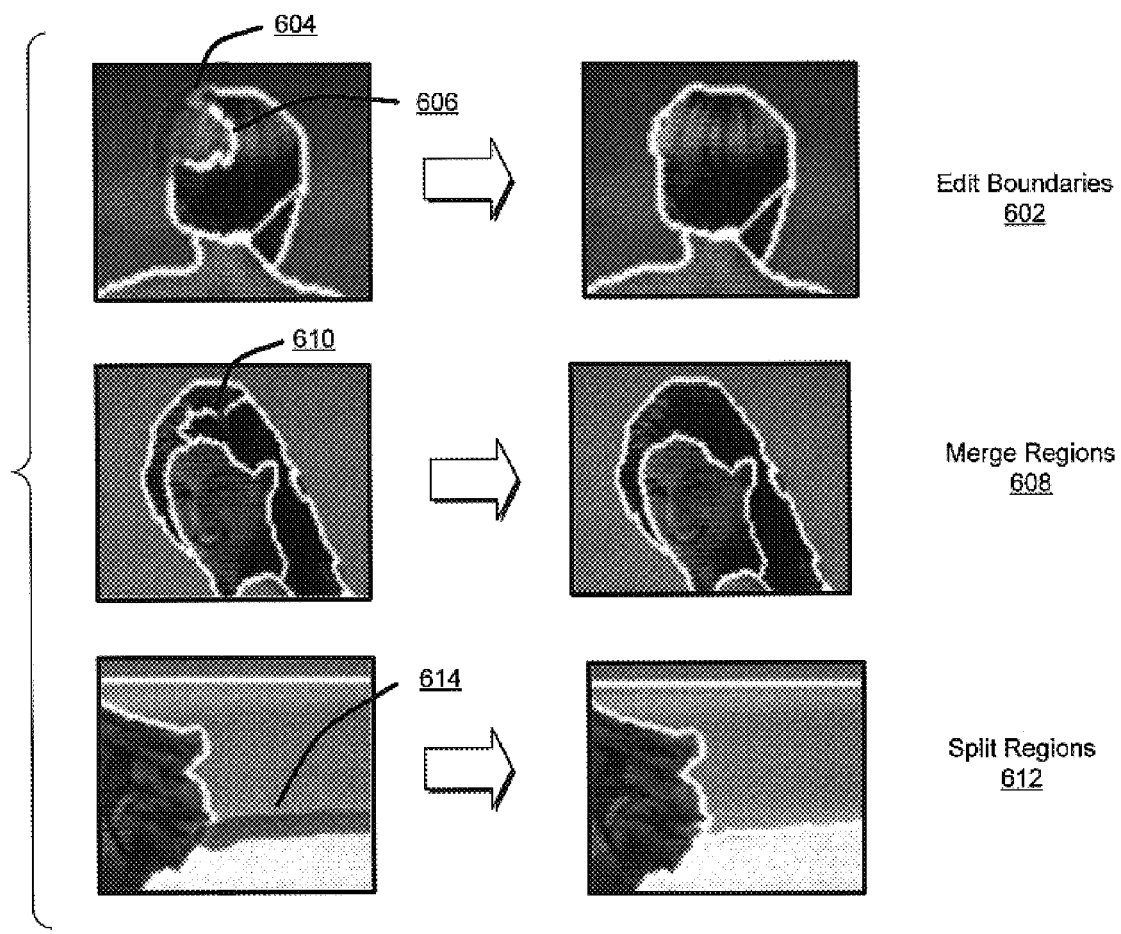
FIG. 6 shows an example of the operation of the segmentation procedure of FIG. 5.

FIG. 6 shows three examples of the operation of the interactive segmentation operation performed by step 504 of FIG. 5.

In the first case 602, the user opts to correct the path of a boundary defined by the automated segmentation algorithm. To make this correction, the user draws a correction mark 604 onto a projection of the image (on the display device 116). Namely, the span of the correction mark 604 (defined by its starting and ending point) identifies a portion of the boundary that the user wishes to correct. In one case, the correction mark 604 is relatively thin, e.g., one pixel in width. In this case, the exact path of the manually drawn correction mark 604 definitely establishes the new path of the boundary. In another case, the user may opt to use a correction mark having a user-selectable width (e.g., 2 or more pixels in width, such as 7 pixels). The user can then apply an automated segmentation algorithm to fine-tune the path of the boundary within a zone defined by the width of the correction mark 604. Namely, the automated segmentation algorithm can attempt to form a more precise boundary within the zone defined by the width of the correction mark 604, e.g., using a pixel-based graph cut segmentation technique. One known technique that can be used to perform this kind of local correction is described in Yin Li, Jian Sun, Chi-Keung Tang, and Heung-Yeung Shum, "Lazy Snapping," Proceedings of ACM SIGGRAPH. 2004, pp. 303-308.

In the specific case of scenario 602, note that the automated segmentation algorithm has produced another boundary path 606. The interactive segmentation process has the effect of removing this boundary path 606. This is because the correction mark 604 also spans from the beginning to the end of this additional boundary path 606. The interactive segmentation process will interpret the correction mark 604 as an instruction to make the desired final boundary conform to the path of the correction mark 604, which has the effect of completely removing the extraneous path 606 (because this path 606 lies outside the zone of correction defined by the correction mark 604).

In a second case 608, the user opts to merge two adjacent regions defined by the automatic segmentation algorithm. In this case, the user adds a correction mark 610 which spans both of the regions that are to be merged. The interactive segmentation process interprets this correction mark 610 as an instruction to merge the two regions. In this manner, the interactive segmentation process removes the white boundary path separating the two adjacent regions.

In a third case 612, the user opts to create an additional region within the auto-segmented image. In this case, the user adds a correction mark 614 which defines a boundary of a new region to be created. The interactive segmentation process interprets this correction mark 614 as an instruction to establish a boundary along the general path of the correction mark 614. More specifically, as described above, in one case the correction mark 614 can have a relatively narrow width, e.g., of one pixel. This kind of mark definitively dictates the path of the new boundary. In another case, the correction mark 614 can have a greater width. This kind of mark defines a general zone in which an automated segmentation algorithm can operate to establish the boundary.

In another variant of the third scenario (although not shown), a correction mark might form a closed curve that has no interaction with an original boundary in the auto-segmented image. In this case, the interactive segmentation algorithm interprets this mark as an instruction to create a new region defined by the inner area of the closed curve.

At the close of the segmentation process, the sketching application module 110 can superimpose the outlines of the defined regions in the segmented image. More specifically, in one exemplary technique, the sketching application module 110 can trace the boundaries of the regions and fit boundary points to Cardinal splines. Also, the sketching application module 110 can provide an interactive mechanism that allows the user to manually add lines that represent strong edges in the regions, delete existing lines, merge splines into a single spline (or vice versa), and so forth. After segmentation and outline drawing, the segmented image comprises a set of regions with vectorized outlines.

Figure 7:
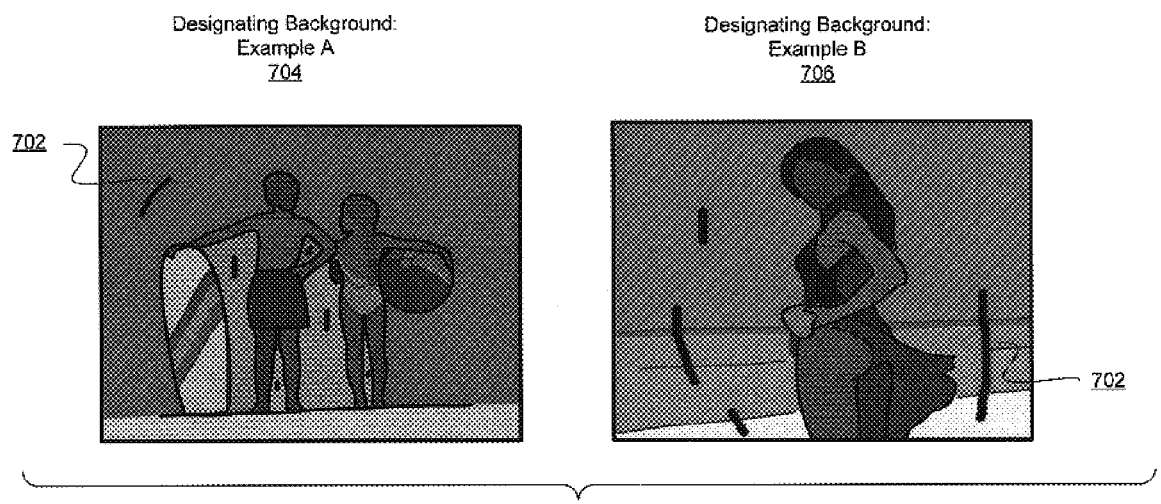
FIG. 7 shows an example of one manner of manually designating background regions within images.

On a related topic, the sketching application module 110 can, at some point in the process, allow the user to manually identify the background regions within the image. FIG. 7 shows one technique for performing this operation. In this technique, the sketching application module 110 provides an interactive mechanism that allows the user to identify the background regions by adding marks 702 to the background regions. In example A (704), the marks can be used to designate a variety of portions of the image, including portions that lie within the interior of foreground objects (such as a region between the two children). In example B (706), the marks can span a range of different background portions in the image.

In other implementations, the sketching application module 110 can apply automated or partly automated techniques to discriminate the background regions from the foreground regions. In any case, tagging the regions as either background or foreground is useful, as the sketching application module 110 applies different rules to a region depending on whether the region represents background or foreground (as will be discussed).

B.3. Boundary Shrinking Procedure

Figure 8:
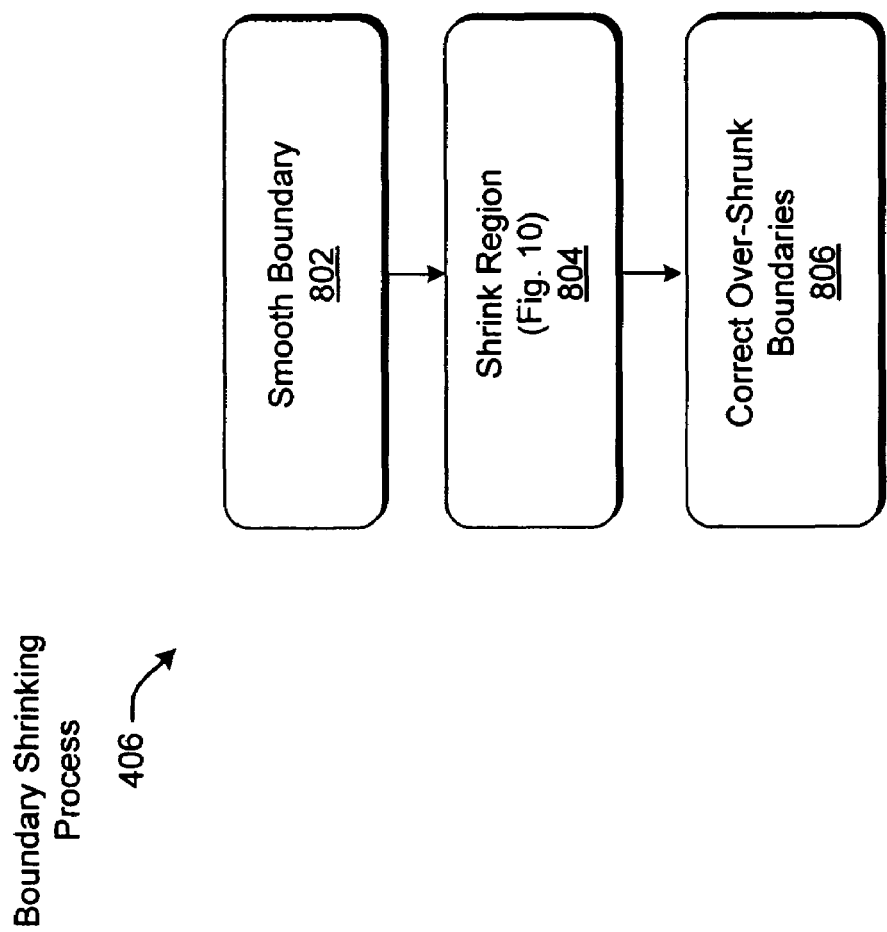
FIG. 8 shows an exemplary boundary shrinking procedure that can be used in the overview procedure of FIG. 4.

FIG. 8 shows an overview of the boundary-shrinking procedure 406 of FIG. 4. As explained above, the purpose of the boundary-shrinking procedure 406 is to retract the coloring of a region from one or more of its original boundaries, to thereby emphasize the original boundaries of the region and to simulate the effects of lighting within the region. To clarify the use of terminology, a shrunk boundary defines the boundary at which the coloring of a region terminates.

In step 802, the sketching application module 110 smoothes the boundaries in the segmented image (produced by the segmentation procedure of step 404 of FIG. 4). Step 802 can also reduce (e.g., down-sample) the number of data points in the boundaries to a group of control points. In one non-limiting example, step 802 can involve down-sampling at a rate of 1/10.

In step 804, the sketching application module 110 shrinks the boundaries produced by step 802. As will be described in greater detail below, this operation comprises, for a particular region, determining the manner in which intensity is distributed within the region, and then determining how to retract at least one boundary of the region based on the determined distribution of intensity.

In step 806, the sketching application module 110 makes corrections for boundaries that have been shrunk too far. Namely, in certain circumstances, a first retracted boundary may intersect a second retracted boundary. Step 806 redraws the boundaries to eliminate this intersection.

FIGS. 9-13 provide additional detail regarding each of the three steps (802-806) in FIG. 8.

Figure 9:
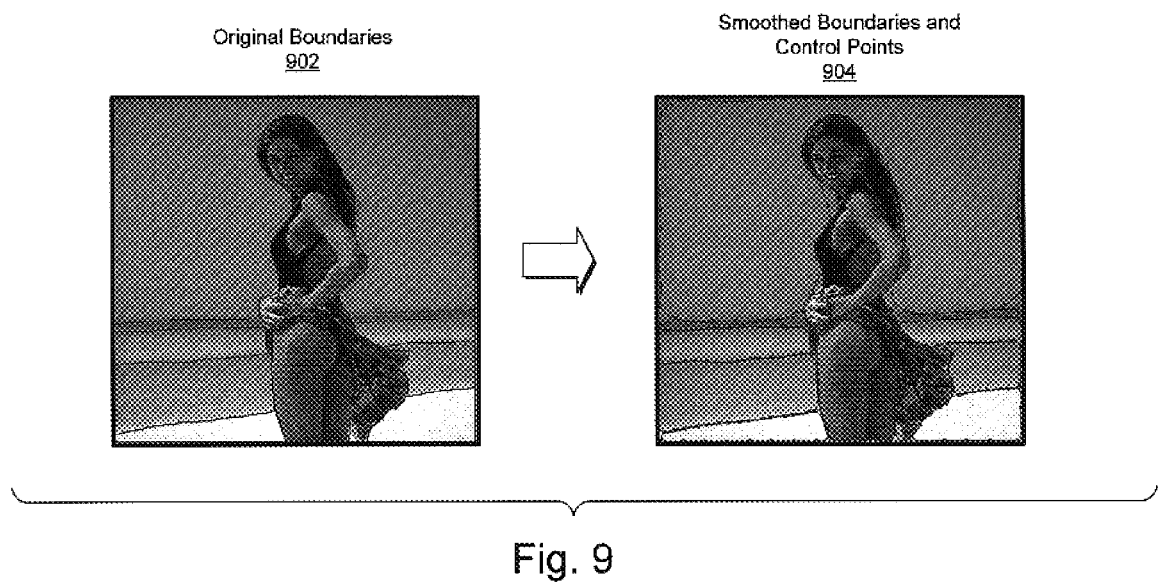
FIG. 9 shows an example of the operation of a smoothing procedure that can be performed in the boundary-shrinking procedure of FIG. 8.

Starting with FIG. 9, image 902 shows a segmented image produced as a result of the segmentation procedure (in step 404) of FIG. 4. The image includes a plurality of regions. The image also includes outlines which identify the original boundaries (i.e., perimeters) of the regions.

Image 904 shows the result of the smoothing operation of step 802 of FIG. 8. Note that the region boundaries are now smoother, meaning that abrupt transitions are transformed into more gradual transitions. The sketching application module 110 can perform this smoothing using various algorithms, such as, but not limited to, low pass FFT filtering. Image 902 also shows that the boundaries have been down-sampled into a series of control points (i.e., the red dots) connected by short line segments.

Figure 10:
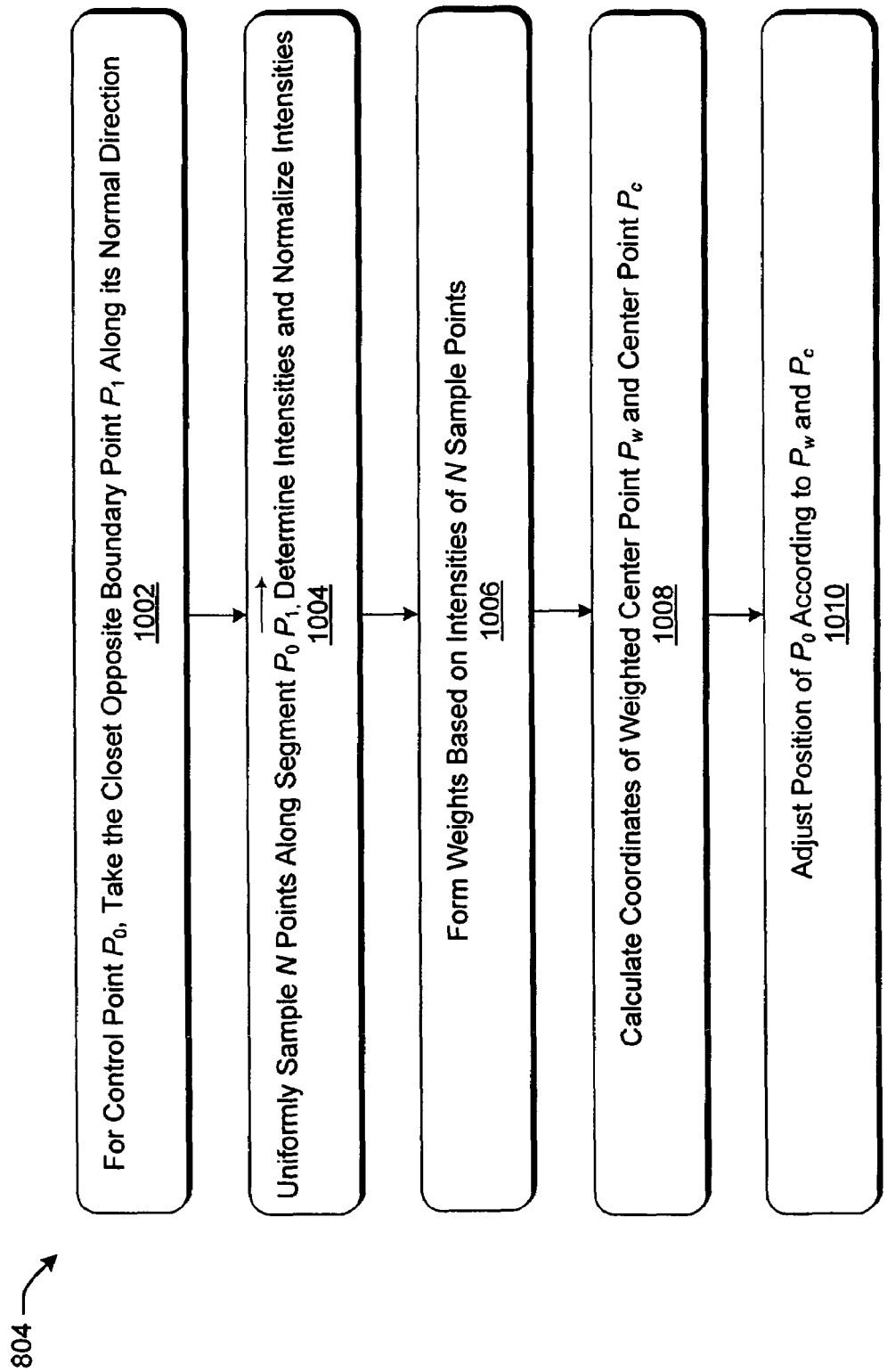
FIG. 10 is a procedure which shows further exemplary details of the boundary-shrinking procedure of FIG. 8.
Figure 11:
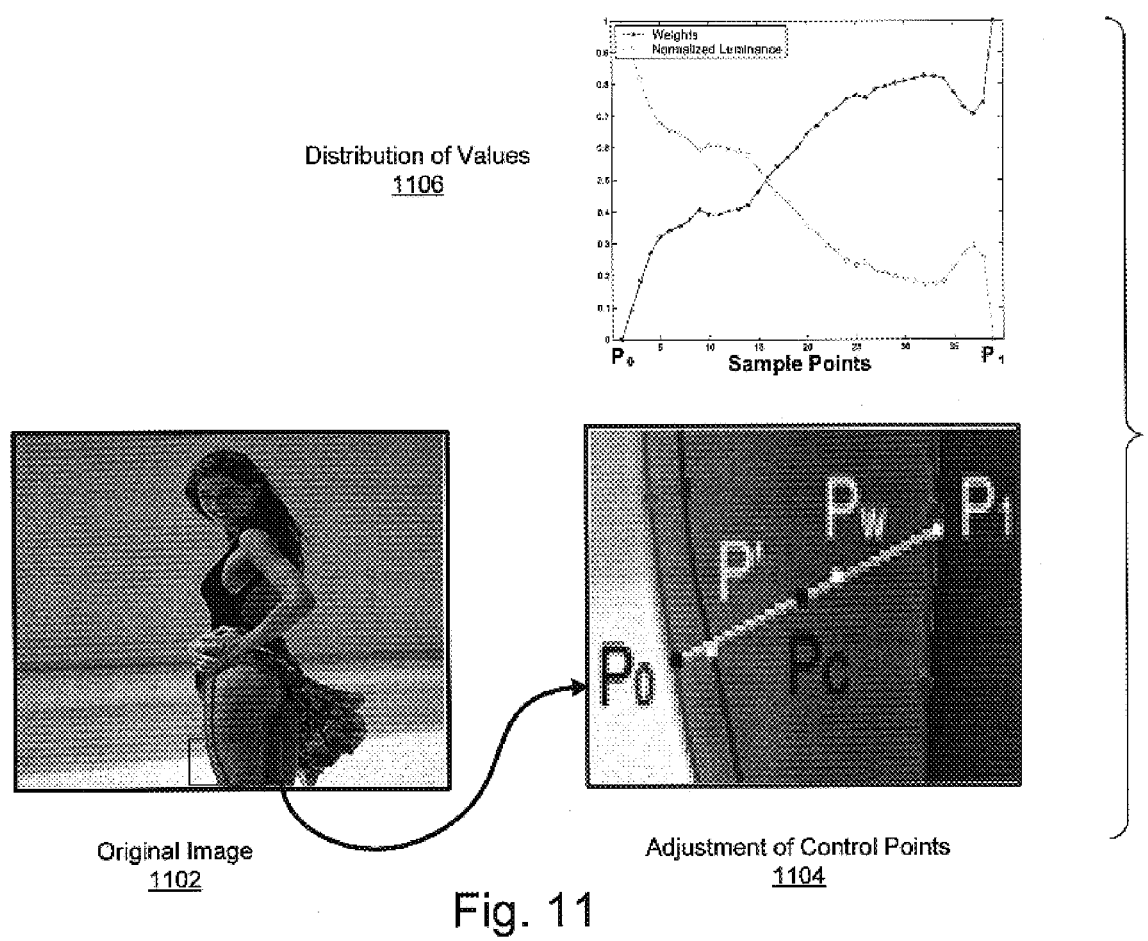
FIG. 11 is an example of the operation of the boundary-shrinking procedure shown in FIG. 10.

FIGS. 10 and 11 provide further details regarding step 804 of FIG. 8, and will discussed together. Namely, FIG. 10 shows a general procedure for shrinking a boundary of a region, while FIG. 11 provides an example of this shrinking procedure.

Generally, the shrinking procedure involves adjusting the position of the control points associated with a region in order to shrink that region. Color will only be applied to the shrunk region, yet the final sketch image may nevertheless still show the original perimeter of the region, e.g., using a dark-colored outline.

According to an exemplary implementation, the sketching application module 110 does not necessarily uniformly shrink the region. Rather, the sketching application module 110 determines a distribution of image intensity within the region and then shrinks the region based on this distribution. In broad terms, the sketching application module 110 retracts color from the part of the region that is assessed as being predominately the brightest. More specifically, the procedure operates by computing the center of intensity along a chord through the region and then shifting the boundary inward so that the geometric center of the new chord shifts toward the center of intensity.

FIG. 10 sets forth one exemplary boundary-shrinking procedure 804 in greater detail with respect to an exemplary region. In step 1002, the sketching application module 110 identifies a control point $P_0$ on a border of the region. The sketching application module 110 then identifies a closest opposite boundary point $P_1$ along point $P_0$'s normal direction. The two points, $P_0$ and $P_1$ define a line segment $P_0P_1$. Images 1102 and 1104 of FIG. 11 graphically depict the meaning of the symbols $P_0$, $P_1$, and $P_0P_1$ in one exemplary application.

In step 1004, the sketching application module 110 uniformly samples N points along the segment $P_0P_1$. This step also involves determining the intensity of the points along the line segment $P_0P_1$. This steps also involves normalizing the intensities into a [0, 1] range. N is proportional to the length of the line segment $P_0P_1$. In other words, $N \propto |P_0P_1|$. The coordinate of the $k^{th}$ point is denoted as $X_k$; its normalized intensity is denoted as $\{I_k\}$, $1 \leq k \leq N$.

In step 1006, the sketching application module 110 sets weights $W_k = 1 - I_k$ for each of the $k^{th}$ sample points, $1 \leq k \leq N$. The graph 1106 shown in FIG. 11 illustrates the distribution of intensity values along the line segment $P_0P_1$, as well as the distribution of weights along the line segment $P_0P_1$ according to one exemplary application.

In step 1008, the sketching application module 110 calculates the coordinates of a weighted center point $P_w$ and a center point $P_c$ along the line segment $P_0P_1$. Images 1102 and 1104 of FIG. 11 graphically depict the meaning of symbols $P_w$ and $P_c$ in one exemplary application.

One equation that can be used to calculate $P_w$ is:

$$X_w = \left(\sum_{k=1}^{N} W_k * X_k\right) \bigg/ \sum_{k=1}^{N} W_k.$$

One equation that can be used to calculate the $P_c$ is:

$$X_c = \left(\sum_{k=1}^{N} X_k\right) \bigg/ N.$$

In step 1010, the sketching application module 110 adjusts the position of $P_0$ according to $P_w$ and $P_c$. Namely, for example, if $|P_0P_w| > |P_0P_c|$, this means that relative darker points are closer to $P_1$. In response, the procedure adjusts $P_0$ inwardly along its normal to a point P', that is, $|P_0P'| = |P_cP_w|$. Otherwise, the sketching application module 110 does not adjust the position of $P_0$. Images 1102 and 1104 of FIG. 11 graphically depict the meaning of point P' in one exemplary application.

Figure 12:
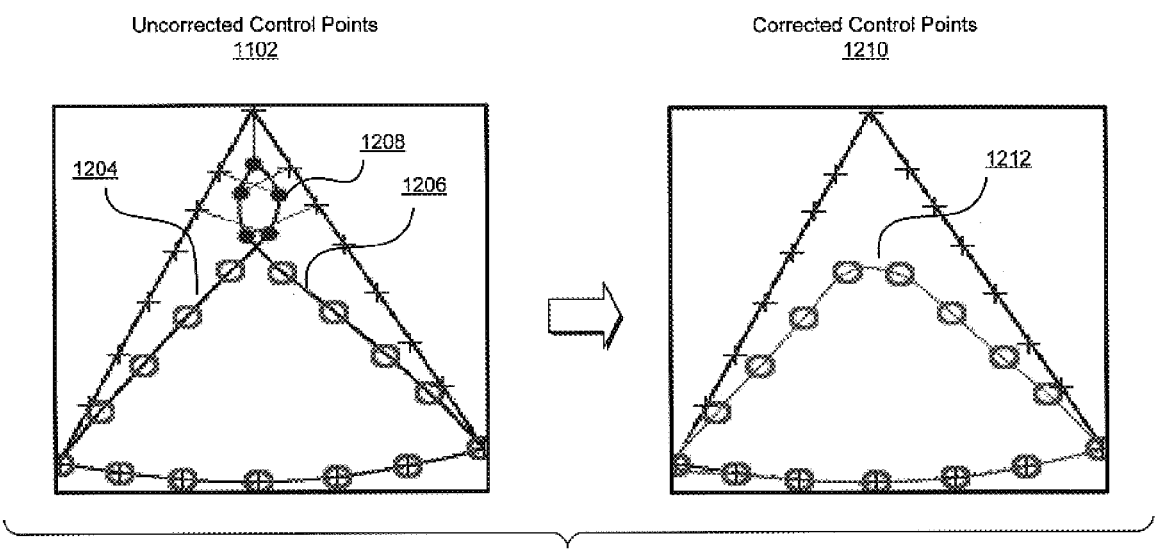
FIG. 12 shows the operation of an exemplary correction procedure that can be performed in the boundary-shrinking procedure of FIG. 8.

FIG. 12 provides further details regarding step 806 of FIG. 8. More specifically, as indicated in an image 1202, both boundary portions 1204 and 1206 are receded due to the shrinking process of step 804. As a result of the shrinking process, the two boundary portions (1204, 1206) intersect at an upper portion 1208. Step 806 of FIG. 8 detects and removes this overlapping portion. Namely, in step 806, the sketching application module 110 removes over-shrunk control points (in portion 1208) and connects remaining control points in proper order. Step 806 can also fit cubic B-splines using the remained control points to obtain a smoothed and shrunk boundary. FIG. 12 shows an image 1210 that depicts the final shrunk boundary 1212.

FIG. 13 shows the resultant transformation produced by the shrinking process of FIG. 8. For frame of reference, an image 1302 shows an original image, corresponding to a photograph of a subject. Two collection of arrows 1304 show exemplary portions of the image 1302 which are relatively bright due to the natural illumination of the scene within the photograph.

An image 1306 shows the segmentation of the image 1302 into multiple regions, and the shrinking of the boundaries of those regions. More specifically, image 1306 still depicts the original perimeter of the regions with dark lines. But the coloration in the interior of these regions is, in some cases, retracted away from the original perimeters. This leaves portions of the regions that lack colorization and therefore appear as the color white (or that generally include a lighter colorization than the predominate portions of the regions).

For example, the image 1306 depicts the original contour of the subject's leg using a dark line, and also depicts the predominate portion of the subject's leg using a flesh-toned color. However, due to the shrinking process, the flesh-toned color is receded from the original perimeter of the region, leaving a white-colored strip along the left side of the leg. Generally, note that exemplary receded portions 1308 in image 1306 correspond to the bright portions 1304 in the original image 1302. Thus, the receded portions generally simulate bright portions in the original image 1302 caused by natural lighting within a scene. The shrinking process also has the desirable benefit of highlighting certain features in the sketch image 1306.

B.4. Color Shifting Procedure

Figure 14:
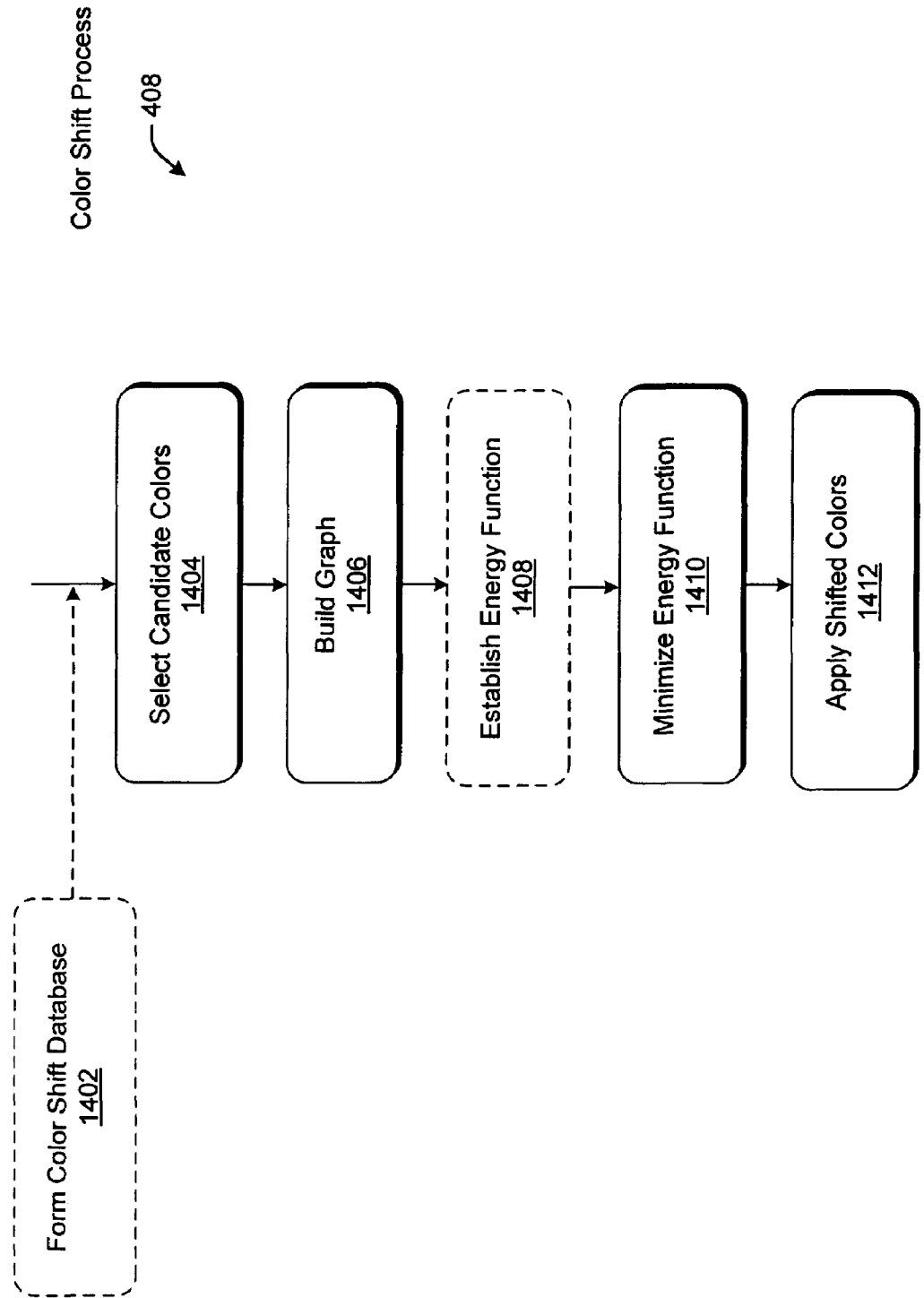
FIG. 14 shows an exemplary color-shifting procedure that can be used in the overview procedure of FIG. 4.

FIG. 14 explains the color shifting procedure (in step 408) of FIG. 4 in greater detail. As a preliminary note, the color shifting procedure can represent the color in different color systems (e.g., different color spaces). The non-limiting examples presented here represent the color using the Munsell Renotation System. This color system represents colors using three perceptual attributes: hue, chroma, and value. By way of notation, bold-formatted variables in the following discussion (e.g., O, P, and R, to be defined below) each denote a color triple (hue, chroma, value). The symbol H( . . . ) denotes a hue component of a color, the symbol C( . . . ) denotes a chroma component of the color, and the symbol V( . . . ) denotes a value component of the color.

The Munsell color system is desirable for use in the shifting procedure because it has uniform and orthogonal properties for each perceptual attribute. The conversion between the Munsell system and the CIE XYZ color space can be found in a number of sources, such as G. Wyszecki and W. S. Stiles, *Color Science: Concepts and Methods, Quantitative Data and Formulae*, Wiley Interscience Publishers, N.Y., 1982.

The color shifting process relies, in part, on color values stored in the color database 308 (of FIG. 3). In the procedure of FIG. 3, step 1402 generally corresponds to a procedure for constructing such a database 308. Preliminary discussion will follow regarding this general step 1402.

The formation process involves accepting a number of reference original images. For example, these reference original images may correspond to digitized photographs or other kinds of original images. The formation process also involves accepting reference sketch images. These reference sketch images may correspond to digitized versions of artists' freehand (manual) rendering of respective reference original images. For each region $\Omega_k$ of the reference original images in the database 308, the formation process involves calculating the region's original average color, denoted as $O_k$. The formation process also involves determining the color that an artist used to represent the original color $O_k$, denoted as a painted color, or $P_k$. The database 308 stores the $O_k$ and $P_k$ color information in pairs for respective regions of the reference original images. Moreover, the database 308 discriminates whether the regions correspond to background regions or foreground regions.

Figure 15:
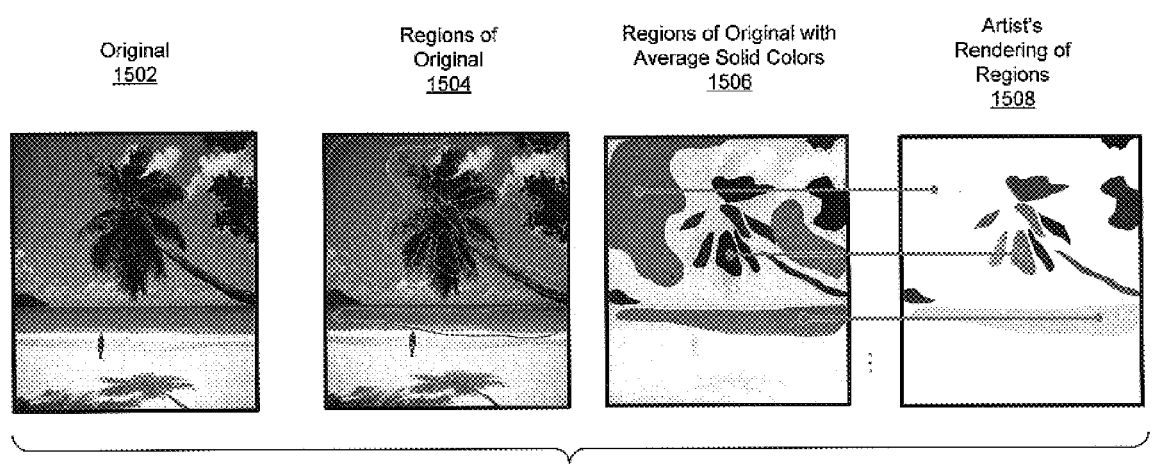
FIG. 15 shows the operation of an exemplary procedure for extracting salient features from images for use in constructing a color shift database.
Figure 16:
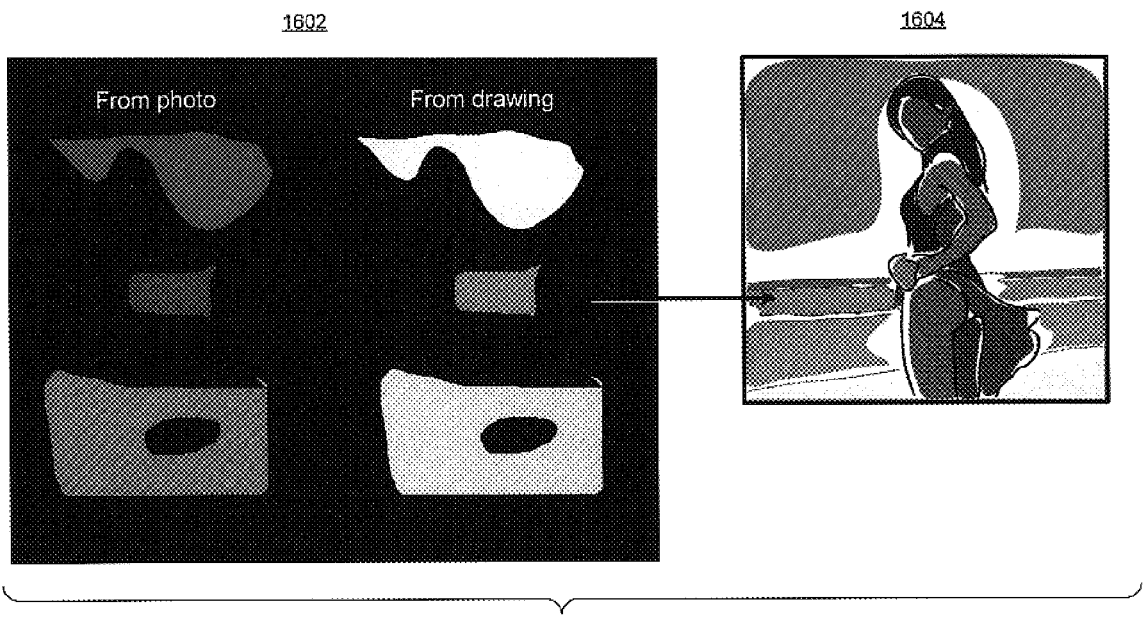
FIG. 16 shows an exemplary manner in which information in the color shift database can be used to select a color in the sketch image.

Advancing momentarily ahead in the sequence of drawings, FIGS. 15 and 16 provide additional information regarding the formation of the database 308. Starting with FIG. 15, a first image 1502 corresponds to a reference original image. A second image 1504 shows the identification of various regions within the image 1502. A third image 1506 shows the selective emphasis of the identified regions in the image 1504, each presented in a color formed by determining the average color of the region. A fourth image 1508 shows regions within an artist's freehand rendition of the original reference image 1502. The horizontal lines bridging the third image 1506 and the fourth image 1508 demonstrate how various regions in the third image 1506 correlate to regions within the fourth image 1508. The database 308 records the information provided in the third and fourth images (1506, 1508), along with the mapping details that correlate these two images (1506, 1508) together.

Thus, when formed, the database 308 comprises an empirical knowledge base that is formed based on a potentially large sample of reference images. The database 308 can be used, along with other considerations, to select a desirable combination of colors for use in a sketch image that is being generated. For instance, consider FIG. 16. Part 1602 of this figure demonstrates how photo-derived image regions are paired with counterpart sketch-derived regions. This figure also generally demonstrates how the color pairs in the database 308 are used to select desirable colors for a sketch being generated (represented by an image shown in part 1604 of FIG. 16)

One exemplary process for selecting colors in a sketch image being generated will now be set forth in detail below, with reference to the steps in FIG. 14. By way of overview, the procedure 408 shown in FIG. 14 defines an optimization algorithm. In this algorithm, the sketching application module 110 selects an optimal or near-optimal set of colors for use in a sketch image being generated based on: information taken from the input original image; information taken from the color shift database 308; and a number of guidelines that capture an artist's thought-process in hand-drawing a sketch image.

The term "input image" used in this section refers to an image that is input to the color shifting process.

Figure 17:
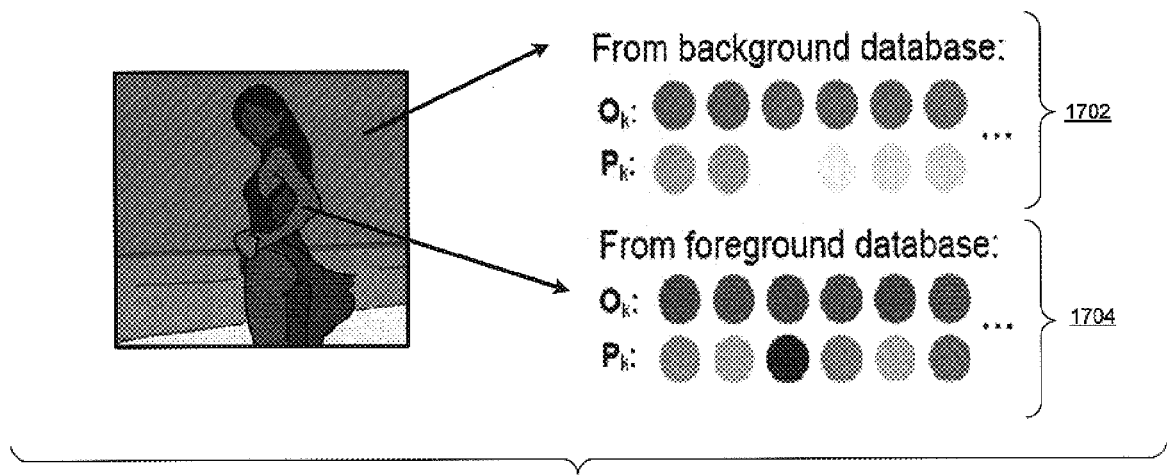
FIG. 17 shows an exemplary selection of candidate colors from the color shift database.

In step 1404, the sketching application module 110 selects candidate colors for use in the optimization process. Namely, consider an image composed of M regions. Each region $\Omega_i$ in the image has an average color $R_i$, $i=1, 2, \ldots, M$. For each region $\Omega_i$, step 1404 involves selecting N candidate colors $P_k$ with label $x_i = k$, $1 \leq k \leq N$ from the color shift database 308. The corresponding original color of $P_k$ is $O_k$, $k=1, 2, \ldots, N$. For example, consider the example shown in FIG. 17. For an exemplary background region, step 1404 involves selecting a set of background candidate colors $(P_k)$ 1702. Similarly, for an exemplary foreground region, step 1404 involves selecting a set of foreground candidate colors $(P_k)$. Moreover, the color shift database 308 provides original counterpart colors $(O_k)$ for each of the candidate colors $(P_k)$.

In selecting the candidate colors, step 1404 can apply the following criteria: (1) $H(P_k) \approx H(R_i)$; and (2) the distance of $R_i$ and $O_k$ in the C-V plane is as small as possible. In order to better ensure that the colors in the color shift database 308 are sufficient to cover the full range of hue, the "$H(P_k) \approx H(R_i)$" criteria can be loosely defined. For instance, the range of hue is [0, 100] in the Munsell color space and the above-defined similarity criteria can require that the difference between $H(P_k)$ and $H(R_i)$ be less than 5.

In step 1406, the sketching application module 110 builds a graph $G=\{Q, Z\}$ based on the input image. Vertices Q represent regions of the image. Edges Z denote links between adjacent regions and regions with similar hue. The graph-building step 1406 eliminates links between the background regions and the foreground regions. This produces two connected sub-graphs, one for background regions and links, and the other for foreground regions, that is, $Q=\{Q_b, Q_f\}$ and $Z=\{Z_b, Z_f\}$. Moreover, $Q_b/Q_f$ represents the background/foreground regions. $Z_b/Z_f$ represents the edges connecting adjacent background/foreground regions or edges connecting background/foreground regions with similar hue but not adjacent.

In step 1408, the sketching application module 110 sets an energy function as follows:

$$E(X) = \sum_{i \in Q} E_1(x_i) + \sum_{(i,j) \in Z} E_2(x_i, x_j)$$

$$E(X) = \sum_{i \in Q_b} E_{1b}(x_i) + \sum_{(i,j) \in Z_b} E_{2b}(x_i, x_j) + \sum_{i \in Q_f} E_{1f}(x_i) + \sum_{(i,j) \in Z_f} E_{2f}(x_i, x_j)$$

A likelihood term $E_1$ in the energy function represents the local cost of the candidate color of a region. A prior energy term $E_2$ represents the compatibility cost of candidate colors of two regions. In other words, the energy $E(X)$ is defined as a Gibbs energy $E(X)$, where $E_1$ is the likelihood energy, encoding the cost when the color $x_i$ is set to region i, and $E_2$ is the prior energy, denoting the cost when colors $x_i$ and $x_j$ are set to two regions linked in the graph. The individual terms in the energy function are described in greater detail below.

In step 1410, the sketching application module 110 minimizes the energy function to obtain the optimal candidate color $P^*_i$ for every region i. Various approaches can be used to minimize the error function. In one exemplary implementation, a loopy belief propagation algorithm (BP) can be used to minimize the energy function $E(X)$. Such a minimization technique is described, for example, in: J. Pearl, *Probabilistic Reasoning in Intelligent Systems: Networks of Plausible Inference*, 1988, Morgan Kaufmann Publishers, San Mateo, Calif.; Y. Weiss, "Interpreting Images by Propagating Bayesian Beliefs," Advances in Neural Information Processing Systems, 1996, pp. 908-914; and W. Freeman, E. Pasztor, and O. Carmichael, 2000, "Learning Low-Level Vision," Int. J.

Computer of Vision," Vol. 40, pp. 1, 25-47. The loopy belief algorithm does not guarantee a global minimum for a graph with multiple loops, but empirical results show that this algorithm is often a good approximation even for a graph with thousands of loops.

In step 1412, the sketching application module 110 applies the colors determined in the preceding step to the sketch image. Namely, the shift color of region $\Omega_i$ from $R_i$ to $R'_i$=(H($R_i$), C($P^*_i$), V($P^*_i$)), i=1, 2, ..., M.

Having set forth the general flow of the color shifting procedure above, additional information will be provided regarding the nature of the energy function. The energy function incorporates into its structure several guidelines that capture the human artist's thought process when generating a freehand sketch image. These guidelines are grouped below for background regions and foreground regions.

For background regions, the following guidelines may apply:

Guideline (b1): The painting color is dependent on not only the original color, but also the size-complexity and shape-complexity of the region.

Here we define two parameters (relative area and relative perimeter) to represent the size and the shape complexity of the region:

Relative area is the ratio between the region area and the image area. This parameter thus represents the size of the region. The relative area of the region $\Omega_i$ is represented as $S(\Omega_i)$, and the relative area for the region which corresponds to the candidate color $P_k$ is denoted as $S_k$.

Relative perimeter is the ratio between the perimeter and the region area. This parameter thus represents the shape complexity of the region. The relative perimeter of the region $\Omega_i$ is denoted as $P(\Omega_i)$, and the relative perimeter of the region which corresponds to the candidate color $P_k$ is denoted as $P_k$.

Figure 18:
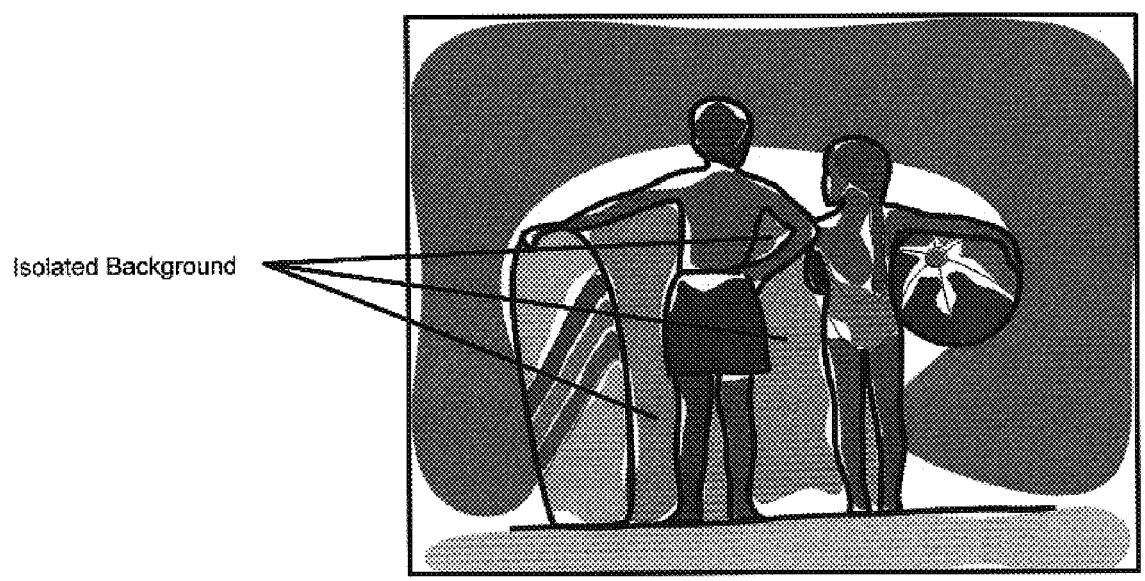
FIG. 18 shows an example of isolated background regions within an image.

Guideline (b2): An isolated background region with a small size or complex boundary shape tends to be painted with a color that is white or close to white. Here, an "isolated" background region refers to a background region in which adjacent regions comprise foreground regions. FIG. 18 provides an example of isolated background regions.

Figure 19:
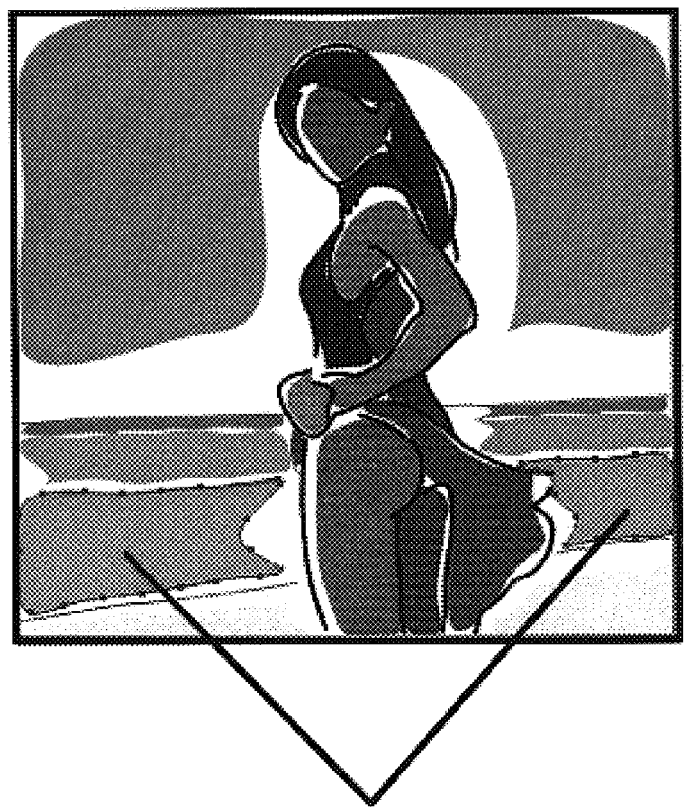
FIG. 19 shows an example of homogenous background regions within an image.

Guideline (b3): If two background regions are not adjacent but have similar color hue, tend to paint them with the same color. This type of background region is referred to as a homogeneous background region. FIG. 19 shows an example of homogeneous background regions. Actually, there exist four pairs of homogeneous background regions in this image. Every background region to the left of the woman has a homogeneous region to her right. For clarity, only one pair of homogenous regions is pointed out in this figure.

Guideline (b4): Tend to keep the original intensity contrast between adjacent regions. The average intensity of the region $\Omega_i$ is denoted as $I(\Omega_i)$, and that of the region which corresponds to the candidate color $P_k$ is denoted as $I_k$.

For foreground regions, the following guidelines may apply:

Guideline (f1): Tend to keep original chroma and value contrast between adjacent and homogeneous foreground regions.

Guideline (f2): Increase chroma and value to enhance the foreground. The following global transformation can be applied to the original color R in accordance with this guideline:

$$H(R')=H(R)$$

$$V(R')=k_v*V(R)+V_0$$

$$C(R')=k_c*C(R)$$

Here, $k_v$, $k_c$ and $V_0$ are constants that can be learned from the foreground color database by linear fitting. For one exemplary and non-limiting color shift database 308, the $k_v$, $k_c$ and $V_0$ values are approximately 0.8, 1.8 and 2.2, respectively.

The above guidelines can be incorporated into the energy function in various ways. The follow pseudo code defines one exemplary manner in which the guidelines can be used to provide values for the terms in the above-identified energy function.

---

Exemplary Computation of Energy Function Terms (1) $E_{b1}(x_i)$ for i ∈ $Q_b$ // corresponding to guideline (b1), (b2)
  If $\Omega_i$ is isolated and $S(\Omega_i) < S_0$ and $P(\Omega_i) < P_0$ // guideline (b2)
    If $V(P_k) > 9.5$ and $C(P_k) < 1$
      $E_{b1}(x_i) = 0$;
    Else
      $E_{b1}(x_i) = 10000$;
  Else // guideline (b1)
    $E_{b1}(x_i) = D_{cv}(R_i, O_k) + \omega_S*|S(\Omega_i)-S_k| + \omega_P*|P(\Omega_i)-P_k|$
(2) $E_{b2}(x_i, x_j)$ for (i, j) ∈ $E_b$ // corresponding to guideline (b3), (b4)
  If $\Omega_i$ and $\Omega_j$ are adjacent //guideline (b4)
    $E_{b2}(x_i, x_j) = \omega_1 * |(I(\Omega_i) - I(\Omega_j)) - (I_{ki} - I_{kj})|$
  Else // means $\Omega_i$ and $\Omega_j$ are homogeneous, guideline (b3)
    If $C(P_{ki}) = C(P_{kj})$ and $V(P_{ki}) = V(P_{kj})$
      $E_{b2}(x_i, x_j) = 0$
    Else
      $E_{b2}(x_i, x_j) = \infty$
(3) $E_{f1}(x_i)$ for i ∈ $Q_f$ //corresponding to guideline (f2)
  $E_{f1}(x_i) = D_{cv}(R_i, O_k) + \omega_r * D_{cv}(R'_i, P_k)$
(4) $E_{f2}(x_i, x_j)$ for (i, j)∈ $E_f$ // corresponding to guideline (f1)
  $E_{f2}(x_i, x_j) = \omega_c*|(C(R_i) - C(R_j)) - (C(P_{ki}) - C(P_{kj}))|$
    $+ \omega_v*|(V(R_i) -V(R_j))- (V(P_{ki})-V(P_{kj}))|$

---

Here, $D_{cv}()$ represents the distance of two colors in the C-V plane. The weights ω are user-defined values. In one exemplary and non-limiting implementation, the default weights can be set to approximately: $\omega_S$=20, $\omega_P$=50, $\omega_I$=0.1, $\omega_r$=1, $\omega_c$=1, and $\omega_v$=0.5.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method for transforming an original image into a sketch image, comprising:

a computer to perform, the steps of:

segmenting the original image into plural regions to produce a segmented image, wherein the regions are demarcated by respective boundaries;

shrinking a boundary of at least one of the plural regions in the segmented image to produce a boundary-shrunk image; and modifying at least one color in the boundary-shrunk image to produce the sketch image, wherein the modifying of said at least one color comprises:

selecting candidate colors to populate the sketch image;

constructing a graph based on a composition of the original image;

defining an energy function that provides an energy value associated with the graph; and using the energy function to derive a desirable selection of the candidate colors for use in the sketch image.

2. The method of claim 1, wherein the modifying of said at least one color manipulates colors in a color space that represents colors in a triple of: hue, chroma, and value.

3. The method of claim 1, wherein the modifying of said at least one color relies on a color database, wherein the color database is formed by:

receiving a plurality of original images;

receiving a plurality of sketch images, wherein the sketch images represent human renditions of the plurality of respective original images; and defining, on a region-by-region basis, how colors are mapped from the plurality of original images to the plurality of sketch images.

4. The method of claim 3, wherein the defining is performed separately for foreground regions and background regions in the plurality of original images and the plurality of sketch images.

5. The method of claim 1, wherein the energy function relies on at least one sketch-related rule to provide the energy value.

6. The method of claim 5, wherein said at least one rule pertains to a background region of the sketch image, wherein said at least one rule comprises one or more of:

guideline (b1): a rendering color is dependent on not only an original color in the original image, but also a size-complexity and shape-complexity of a region;

guideline (b2): an isolated background region with a small size or complex boundary shape should be rendered with a light color;

guideline (b3): if two background regions are not adjacent but have similar color hue, these regions should be rendered with the same color; or guideline (b4): the original intensity contrast between adjacent regions should be maintained.

7. The method of claim 5, wherein said at least one rule pertains to a foreground region of the sketch image, wherein said at least one rule comprises one or more of:

guideline (f1): original chroma and value contrast between adjacent and homogeneous foreground regions should be maintained; or guideline (f2): chroma and value should be increased to enhance the foreground.

* * * * *